United States Patent
Daniell

(10) Patent No.: US 9,235,896 B2
(45) Date of Patent: Jan. 12, 2016

(54) SONAR IMAGING

(71) Applicant: Seebyte Limited, Edinburgh (GB)

(72) Inventor: Oliver Daniell, Edinburgh (GB)

(73) Assignee: Seebyte Limited, Edinburgh (GB)

( * ) Notice: Subject to any disclaimer, the term of this patent is extended or adjusted under 35 U.S.C. 154(b) by 183 days.

(21) Appl. No.: 14/030,749

(22) Filed: Sep. 18, 2013

(65) Prior Publication Data

US 2014/0079287 A1 Mar. 20, 2014

(30) Foreign Application Priority Data

Sep. 18, 2012 (GB) .................. 1216659.1

(51) Int. Cl.
*G06T 7/00* (2006.01)
*G01S 7/539* (2006.01)
*G01S 15/89* (2006.01)

(52) U.S. Cl.
CPC ............ *G06T 7/0044* (2013.01); *G01S 7/539* (2013.01); *G01S 15/89* (2013.01)

(58) Field of Classification Search
None
See application file for complete search history.

(56) References Cited

U.S. PATENT DOCUMENTS

| | | | | |
|---|---|---|---|---|
| 5,155,706 A * | 10/1992 | Haley | ............... | G01C 21/005 367/11 |
| 5,181,254 A * | 1/1993 | Schweizer | ............. | G01S 7/539 348/163 |
| 5,214,744 A * | 5/1993 | Schweizer | ......... | G01S 7/52004 382/103 |
| 5,315,538 A * | 5/1994 | Borrell | ..................... | G01S 3/80 702/189 |
| 5,321,667 A | 6/1994 | Audi et al. | | |
| 5,612,928 A * | 3/1997 | Haley | ....................... | G06K 9/46 367/11 |
| 5,937,078 A * | 8/1999 | Hyland | ................ | G06K 9/3241 342/90 |
| 6,052,485 A * | 4/2000 | Nelson | ................ | G06K 9/3241 382/225 |
| 6,173,070 B1 * | 1/2001 | Michael | ............. | G06K 9/00201 382/145 |
| 7,917,540 B2 * | 3/2011 | Kirby | ................. | G06K 9/00288 382/170 |
| 2004/0136571 A1 * | 7/2004 | Hewitson | ............ | G09B 21/003 382/114 |
| 2004/0165478 A1 * | 8/2004 | Harmon, Jr. | ............ | G01S 7/539 367/87 |
| 2008/0175446 A1 * | 7/2008 | Kirby | ................ | G06K 9/00295 382/118 |
| 2009/0016161 A1 * | 1/2009 | Gendron | ............ | G01S 15/8902 367/88 |
| 2009/0060353 A1 * | 3/2009 | Saisan | ................ | G06K 9/6247 382/224 |
| 2009/0232406 A1 | 9/2009 | Saisan | | |

FOREIGN PATENT DOCUMENTS

GB 2251309 A 7/1992

OTHER PUBLICATIONS

Dobeck, G.J., "Image Normalization Using the Serpentine Forward-Backward Filter: Application To High-Resolution Sonar Imagery and Its Impact On Mine Detection and Classification," In the Proceedings of SPIE, 2005, pp. 381-391, vol. 5794, USA.

(Continued)

*Primary Examiner* — Tsung-Yin Tsai
(74) *Attorney, Agent, or Firm* — Alston & Bird LLP

(57) ABSTRACT

A method for recognizing a target in a sonar image, the method comprising: normalizing a sonar image; using/defining multiple test objects; rotating each test object between multiple positions; using a projection of each test object in each position as a template, so that multiple templates are provided for each test object, each template corresponding to a different rotational position; applying the multiple templates for the multiple test objects to the normalized image; and creating at least one feature vector for the image for use in target recognition.

19 Claims, 9 Drawing Sheets

(56) References Cited

OTHER PUBLICATIONS

Mignotte, P. Y., et al., "PATT: A Performance Analysis and Training Tool for the Assessment and Adaptive Planning of Mine Counter Measure (MCM) Operations," Oceans 2009, MTS/IEEE Biloxi—Marine Technology for Our Future: Global and Local Challenges, 2009, 10 pages, USA.

Intellectual Property Office, Search Report for Application No. GB1216659.1, 3 pages, United Kingdom.

\* cited by examiner

SONAR IMAGING

CROSS-REFERENCE TO RELATED APPLICATION

This application claims priority to and the benefit of United Kingdom Application No. 1216659.1, filed Sep. 18, 2012, the entire disclosure and contents of which is hereby incorporated by reference herein.

BACKGROUND

1. Technical Field

The present invention relates to sonar imaging, and in particular sidescan sonar and forward looking sonar imaging.

2. Related Art

Sidescan Sonar (SSS) is used for surveying large areas of the sea floor for sea bottom targets. Side-scan sonar uses a device that emits sonar pulses down toward the seafloor across a narrow angle perpendicular to the path of the sensor through the water. Reflections from the seafloor are recorded in across-track slices. When stitched together along the direction of motion, these slices form an amplitude image of the seafloor within the beam coverage.

Forward Looking Sonar (FLS) is used to provide a real time view of the seafloor in front of the vehicle. The sonar pulse is emitted in a narrow beam that is scanned across a field of view about the direction of travel to form radial slices of the sea floor. When stitched together, perpendicular to the direction of motion, these slices form an amplitude image of the sea floor.

SSS and FLS images are often searched visually by an operator to identify objects on the seafloor. This is time consuming and subject to human error. Automatic Target Recognition (ATR) algorithms can assist operators to identify sea bottom targets. Properly applied, this reduces the time taken to analyse a large survey and increases confidence in the results.

Whilst ATR algorithms help detect targets, the performance of current generation ATR algorithms is often specific to sensor payload and operational conditions. Particularly with supervised filter response algorithms, a small change to the speed of the vehicle or the Time Variable Gain (TVG) can cause a large drop in the probability of detection.

BRIEF SUMMARY

According to the present invention there is provided a method for use in automatic target recognition in sonar imaging, the method comprising: normalising a sonar image; using multiple test objects; rotating each test object between multiple positions; using a projection of each test object in each position as a template, so that multiple templates are provided for each test object, each template corresponding to a different rotational position; and applying the multiple templates for the multiple test object to the normalised image to measure first and second order statistics over the template; choosing the template position where the statistics are most object-like; and detecting an object from the measured statistics using a supervised machine learning algorithm.

Each template comprises at least a highlight region or a shadow region. The templates are adapted locally to the specific range and resolution of the object.

A plurality of classes of template is defined for each template. The plurality of classes of template may comprise a bounded front template, in which a region is added before the highlight region in an across-track direction, for example a region the same size as the highlight region is added before the highlight region in an across-track direction. The plurality of classes of template may comprise a bounded side template, in which each side of the combined highlight and shadow region is bounded.

Applying the multiple templates for the multiple test objects to the normalised image to detect an object in the normalised image may involve convolving the multiple templates with the normalised image.

Normalising features in the sonar image may involve normalising the whole image and then applying the multiple templates or normalising one pixel of the image based on local image statistics and then applying the multiple templates for that pixel.

The method may involve using the normalised image to define a plurality of skewed integral images, each for a different skew angle, and applying the multiple templates for the multiple test objects to the skewed integral images. By using integer skewed integral images, the computational requirements are reduced. The skewed integral images may be skewed at angles that correspond to the different rotational positions of the templates.

The method may further involve determining at least one feature value for each template, the feature value for each template being included in the feature vector. When a plurality of classes of template is provided the method may further involve determining a feature value for each template class and adding the feature value for each template class to the feature vector.

The method may further involve using the feature vector for target recognition. The feature vector may be used in a target recognition classifier. The target recognition classifier is supervised machine learning algorithm.

According to another aspect of the invention, there is provided a computer implemented target detection system adapted to perform the method of the invention.

The above-mentioned characteristics, in addition to the other aspects of the present invention, will be better understood by reference to the detailed description of the figures hereinafter.

BRIEF DESCRIPTION OF THE SEVERAL VIEWS OF THE DRAWING(S)

Various embodiment of the present invention will now be described in greater detail with reference to an example of embodiment represented in the drawings, of which:

Figure 4:
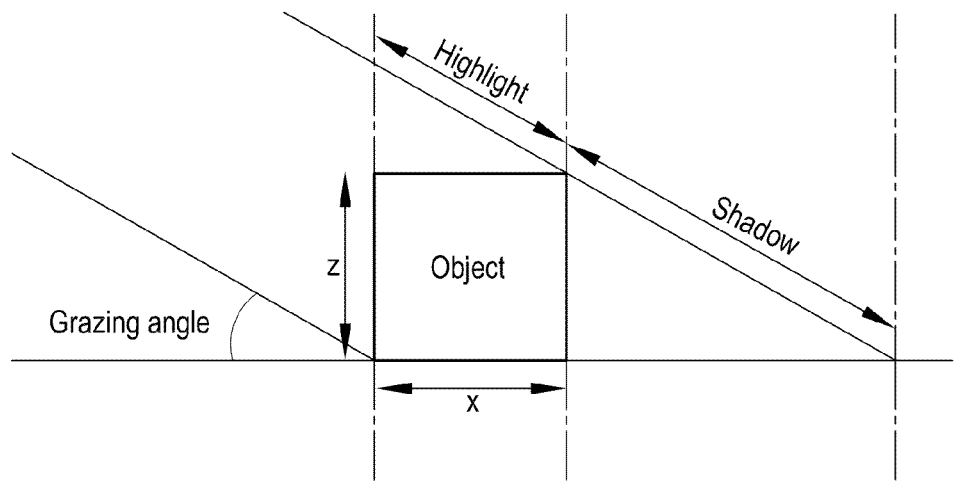
Figure 5:
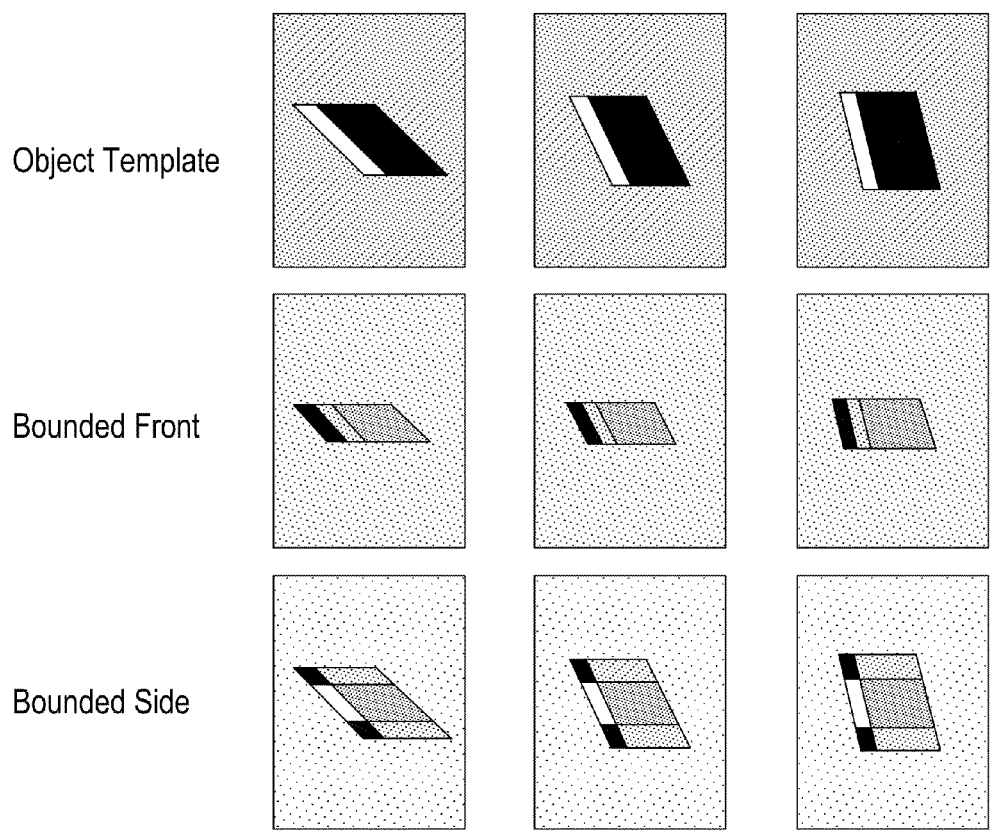
Figure 6:
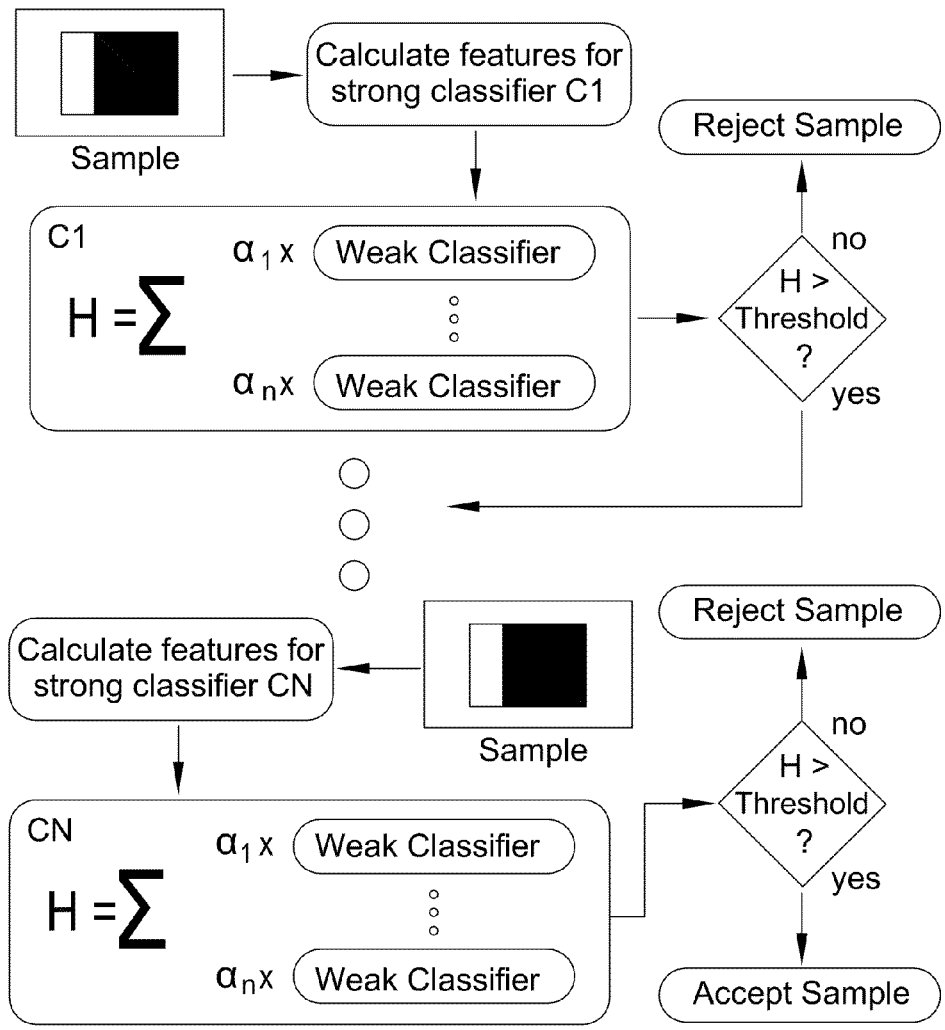
Figure 7:
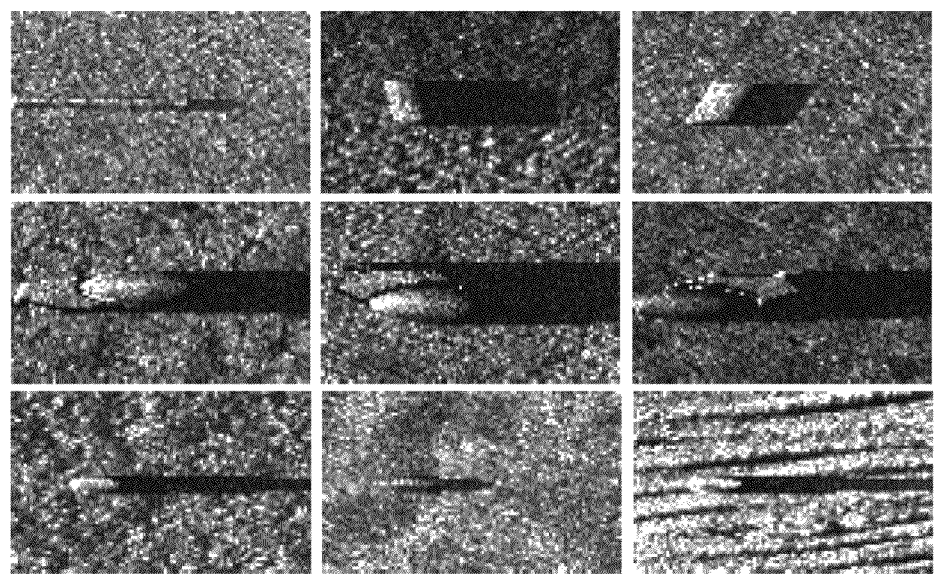
Figure 8:
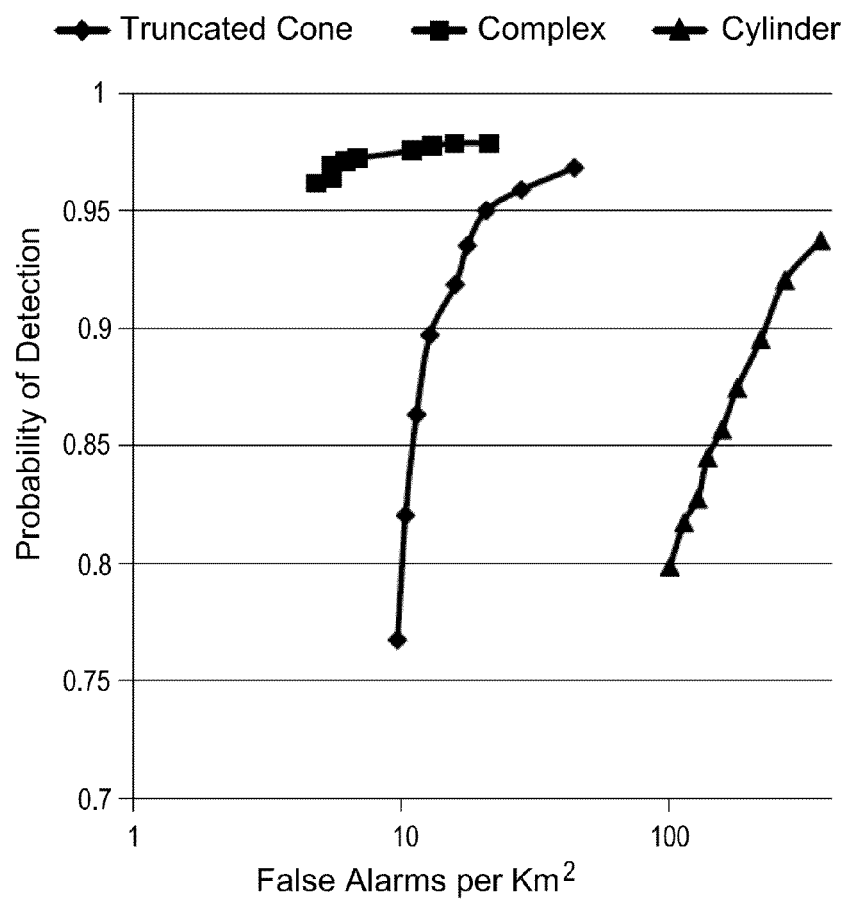
Figure 9:
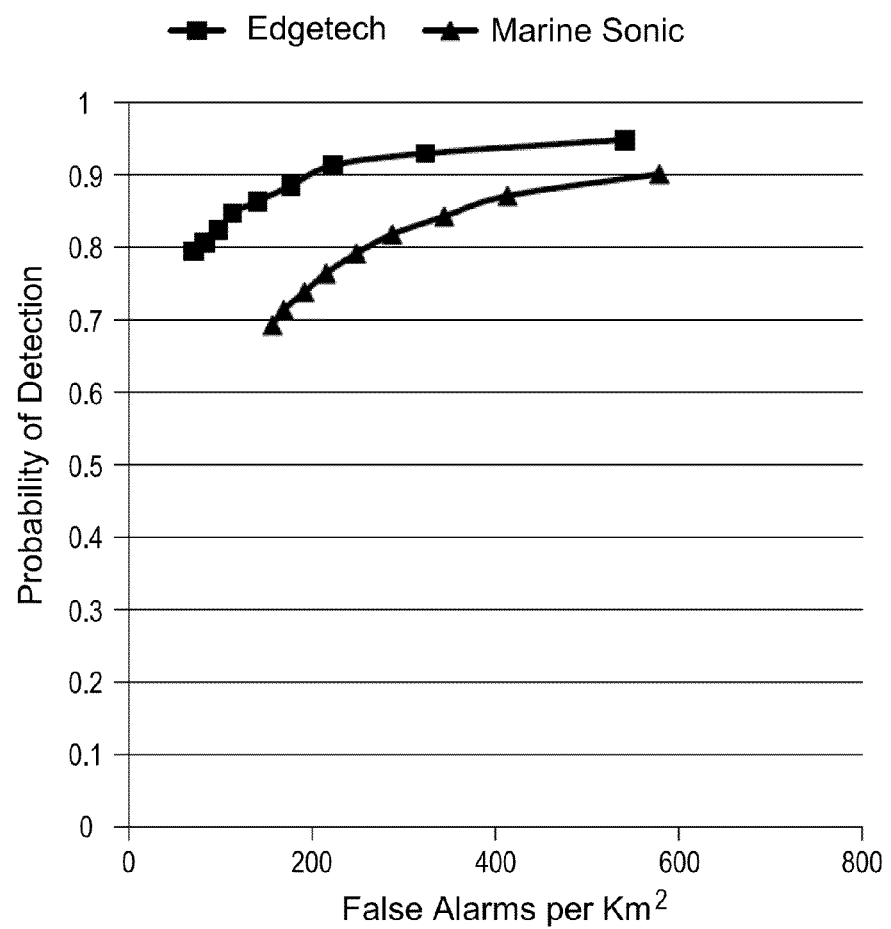
Figure 10:
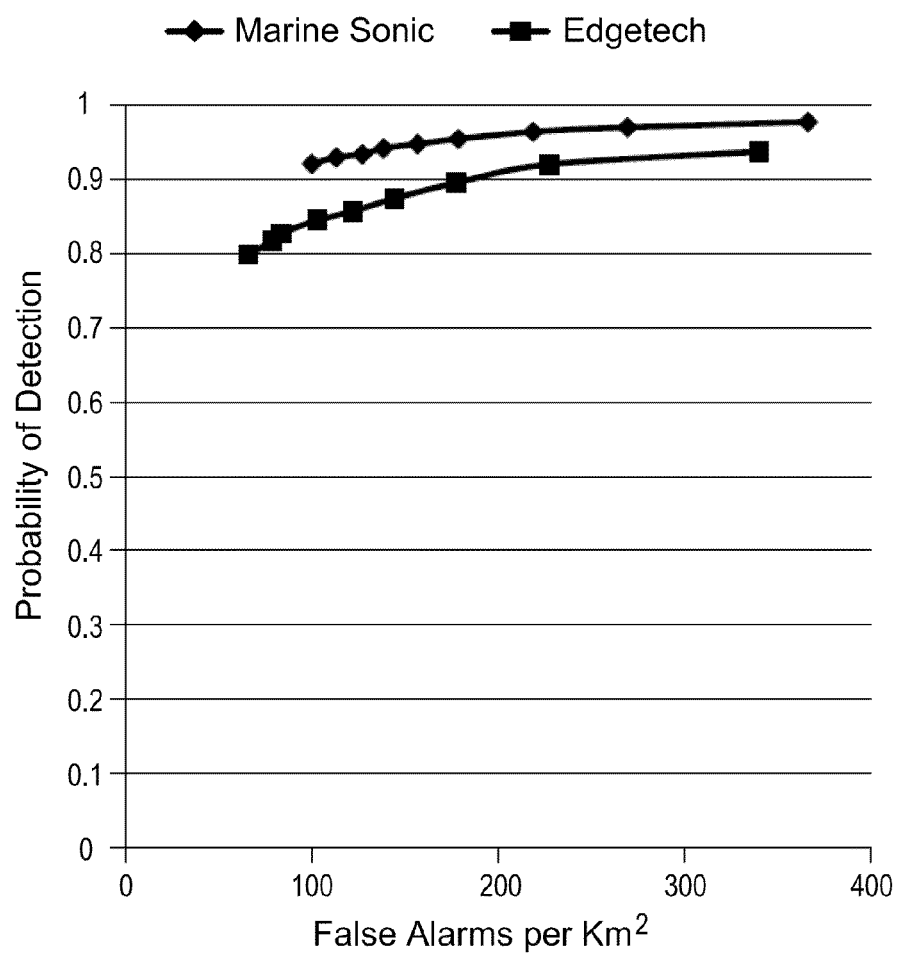

FIG. 4 models the size of highlight and shadow regions for a cube like object;

FIG. 5 is an example of an extended feature set;

FIG. 6 is a block diagram of a cascade of boosted weak classifiers;

FIG. 7 shows examples of augmented reality targets (top: cylinder; middle: complex; bottom: truncated cone);

FIG. 8 is a plot of false alarms against probability of detection for a classifier trained and tested on Edgetech data;

FIG. 9 is a plot of false alarms against probability of detection for a cylindrical classifier trained entirely on Edgetech data and tested on MarineSonics & Edgetech data, and FIG. 10 is a plot of false alarms against probability of detection for a classifier trained and tested on MarineSonics and Edgetech data.

DETAILED DESCRIPTION OF VARIOUS EMBODIMENTS

The present invention is applicable to sonar imaging. Sonar imaging uses sensors which have imaging geometries where: the emitter can be approximated as a point source; the emitter illuminates or insonifies the object at a known grazing angle; the object is located on a planar surface; and the angle from the imaging sensor to the planar surface is known. Examples of sensors displaying this geometry are sidescan sonar and forward looking sonar.

Figure 1A:
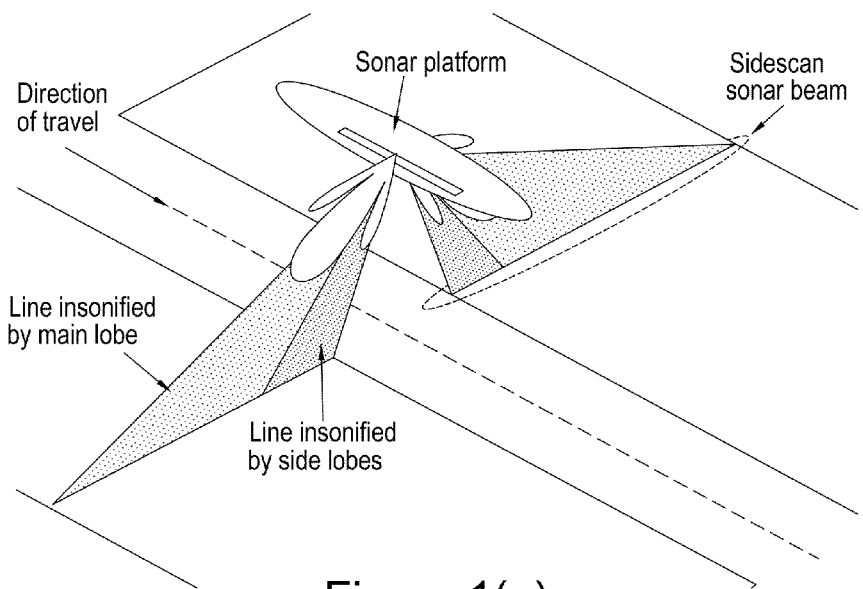
FIG. 1(a) is a schematic diagram of a side scan sonar system.

FIG. 1(a) shows a sidescan sonar sensor system. In this, sensors are mounted on the side of an underwater vehicle. They comprise an array of transducers mounted parallel to the direction of motion. Sidescan sonar sensors generate a fan shaped acoustic beam perpendicular to the direction of motion and the sea-floor. The intensity of the acoustic return from the sea floor, objects, and other scatters are integrated by their time of flight to determine the intensity of a pixel. The pixels ordered by time of flight form an intensity image perpendicular to the direction of motion. When stitched together along the direction of motion, these slices form an image of the seafloor within the beam coverage.

Figure 1B:
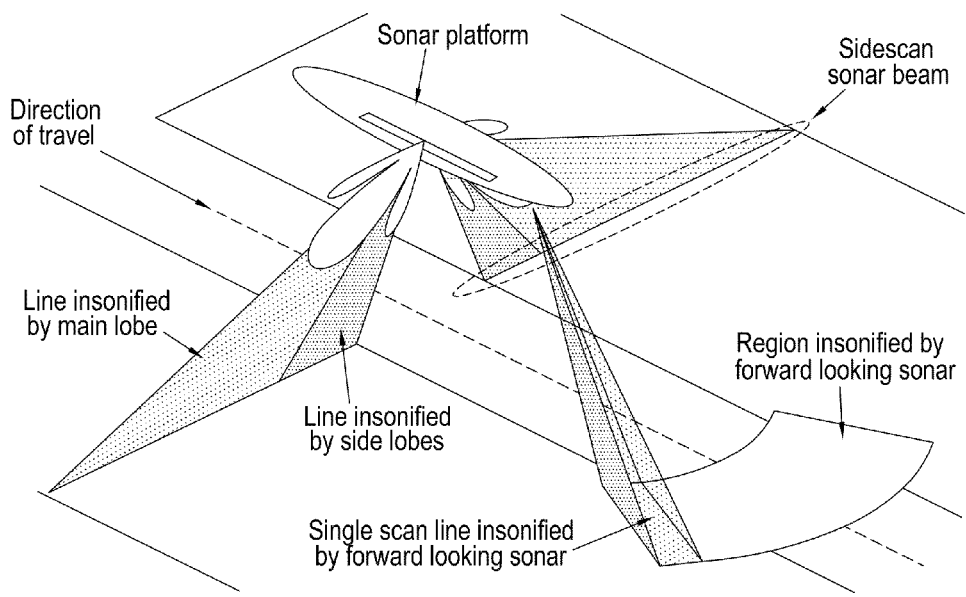
FIG. 1(b) is a schematic diagram of a forward-looking side scan sonar system.

FIG. 1(b) shows a forward look sonar system. In this, sensors are mounted on the front of a vehicle. They emit a fan shaped beam perpendicular to the sea-floor. The beam can be scanned mechanically or electronically across a range of angles in front of the vehicle. When stitched together these slices form an image of the seafloor, in front of the vehicle, within the beam coverage.

For both side scan and forward looking sonar, associated with the sensors is a detector, and a computer processor that has access to computer software and/or hardware that is configured to analyse the reflected signals to create images that can be used to detect and identify objects. Techniques for capturing reflected signals and generating side scan sonar or forward look sonar images are well known in the art and so will not be described in detail.

Figure 2:
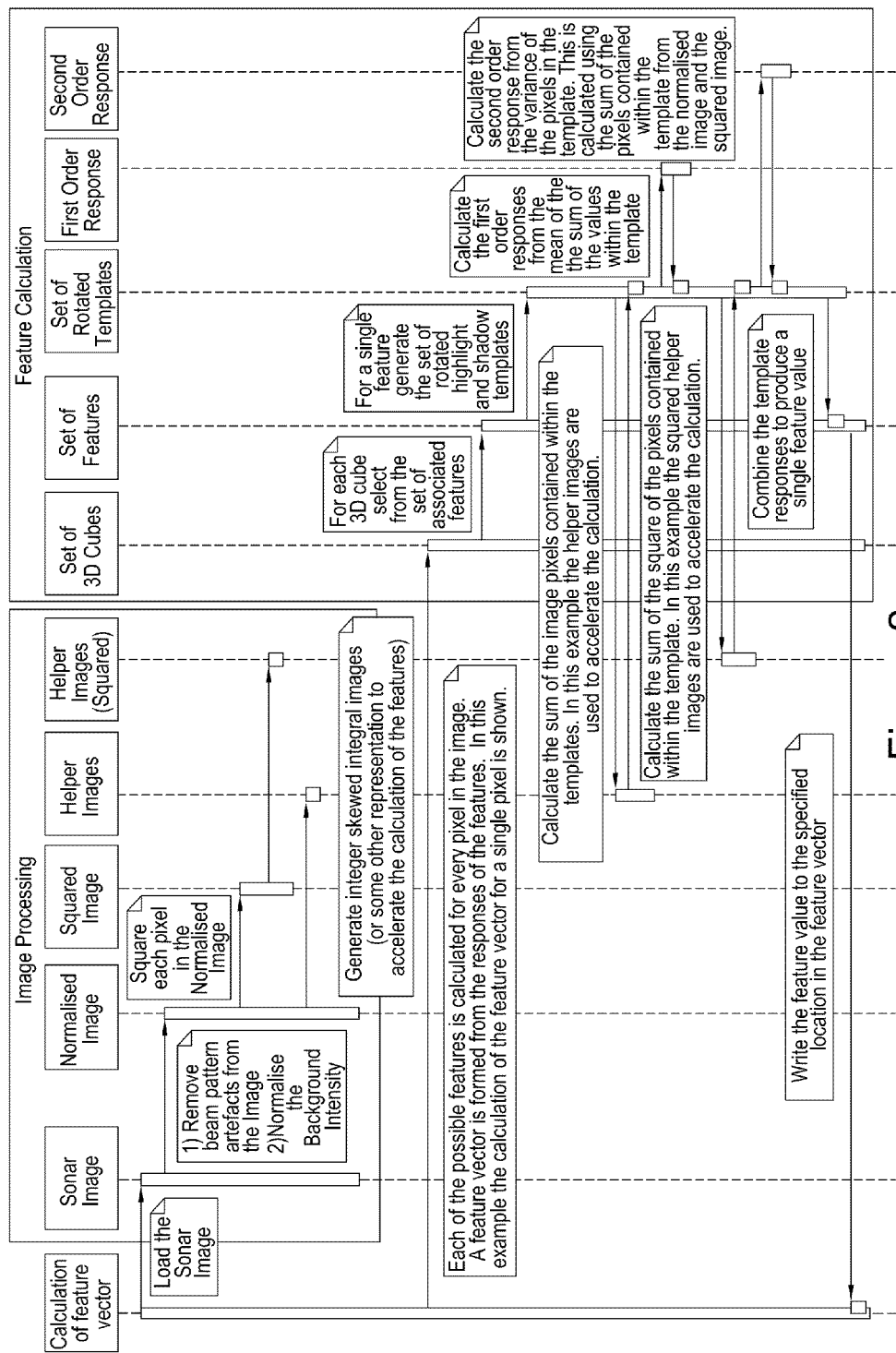
FIG. 2 is a schematic diagram showing various stages in a target detection process in a sonar image.

FIG. 2 shows a flow diagram of the feature extraction stage of a sonar object detection process. The method generally involves normalising the image (either locally or across the whole image); calculating the square of the intensity of each pixel in the normalised image; and defining helper images to accelerate calculation of mean and variance of skewed rectangular regions in the image. Once the normalised image is prepared, multiple templates are formed using a plurality of known objects, typically boxes or cuboids. Highlight and shadow regions from each object are approximated as skewed rectangles, and used to define a template. Additional skewed rectangles are defined to form boundaries round the highlight shadow regions. These are also used to form templates. The templates are applied to the prepared image and the mean and variance of the pixels inside the skewed rectangles forming the templates are calculated. Once all of the templates have been applied, the template responses most likely to correspond to the orientation of a hypothetical object located at a pixel are identified and used to form a feature vector. The feature vector is used identify/recognise objects. The method will now be described in more detail.

Images that are captured are firstly normalised. The aim of image normalisation is to reconstruct the image that would have been produced independent of factors such as beam pattern and sonar loss. For object detection, it is sufficient to normalise the background intensity. Features can be normalised locally, but this prevents the absolute value of the pixels being used as a feature. Any suitable normalisation technique can be used, but in a preferred example the method proposed by Dobeck is used (see G. J. Dobeck. "Image normalization using the serpentine forward-backward filter: application to high-resolution sonar imagery and its impact on mine detection and classification". in Proc. Spie, vol. 5794, 2005, the contents of which are incorporated herein by reference). This method uses adaptive filters, which track paths of similar intensity through the image. The filters can follow surface returns and beam patterns effectively removing unwanted artefacts from the image.

The intensity of each pixel in the normalised image is squared to produce an image (referred to as the "Squared Image"). The mean intensity of a region can be calculated from the normalised image and the standard deviation from both the normalised and Squared Images. This is a standard calculation and therefore is not described here. To accelerate these calculations integer skewed integral images ("helper images") are calculated from both the normalised and the Squared Image. An integer skewed integral image is calculated from an image i(x; y). Integer skewed integral images are images in which subsequent rows of the image have been skewed by an angle arctan($\alpha/\beta$), where $\alpha$ and $\beta$ are integer constants. The formulation is similar to that of the standard integral image with the addition of a skew function s(y,y') to calculate the horizontal shift between each row of the image. The integral image I(x, y) is calculated from the normalised image i(x; y) as $$I(x, y) = \sum_{\substack{y' \leq y \\ x' \leq max(0, x - s(y, y'))}} i(x', y') \quad (1)$$

where $$s(y, y') = \left(\left\lfloor \frac{y}{\beta} \right\rfloor - \left\lfloor \frac{y'}{\beta} \right\rfloor\right) \times \alpha$$

Figure 3:
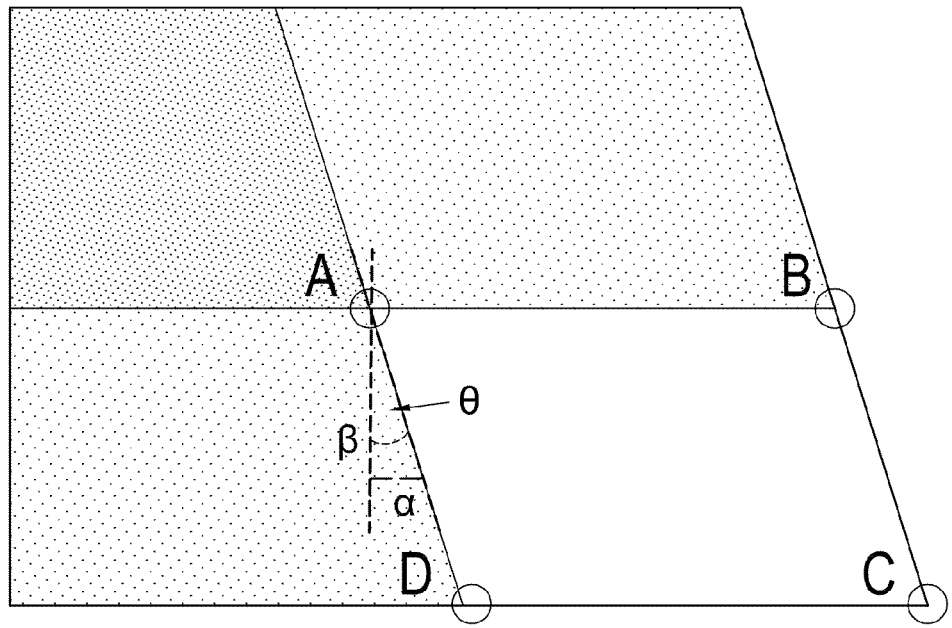
FIG. 3 illustrates how the sum of the pixels of a region can be reduced to a function of four points in an integer skewed integral image representation.

A number of skewed integral images can be calculated corresponding to different skew angles. The regions that can be calculated from these images are constrained by the skew angle of the image. The skewed rectangular region, defined in FIG. 3 can be calculated as $$\sum i(x', y') = I(A) + I(C) - I(B) - I(D) \quad (2)$$

where $$A(y) < y' \leq C(y)$$
$$A(x) - s(y', A(y)) < x' \leq C(x) - s(y', A(y))$$

Where valid positions for A, B, C and D are:

$$A(y)=B(y)$$

$$C(y)=D(y)$$

$$A(\chi)=D(\chi)-s(D)(y),A(y))$$

$$B(\chi)=C(\chi)-s(B)(y),C(y)) \quad (3)$$

The skewed integral images are used to approximate the highlight and shadow geometry produced by a box or cuboid located on the sea floor. By varying α and β, an approximately uniform distribution of box or cuboid angles relative to the sonar array can be created. This is demonstrated in Table 1:

| α | β | Angle |
|---|---|---|
| −4 | 1 | −76° |
| −2 | 1 | −63° |
| −1 | 1 | −45° |
| −1 | 2 | −27° |
| −1 | 4 | −14° |
| 0 | 1 | 0° and 90° |
| 1 | 4 | 14° |
| 1 | 2 | 27° |
| 1 | 1 | 45° |
| 2 | 1 | 63° |
| 4 | 1 | 76° |

As noted above, the target detection method of the invention is template based. It involves selecting multiple test objects, for example a box or cuboid; rotating each test object between multiple positions; using a two dimensional projection of each test object in each position as a template, so that multiple templates are provided for each test object, each template corresponding to a different rotational position. Once this is done, the mean and variance of the regions defined by the templates are calculated from the normalised images or alternatively via the integer skewed integral images. Only the mean and variance corresponding to the template most like that of an object are retained and used to detect an object.

FIG. 2 shows steps for identifying suitable features for object recognition. To train the detector each possible feature is calculated for every pixel in the image. After the detector is trained only the most useful features are calculated. A feature vector is formed from the response of the features. In the example shown in FIG. 2, calculation of the feature vector for a single pixel is shown.

Firstly, a set of boxes or cuboids is defined with across-track dimension x, along-track dimension y and height z, where each box or cuboid in the set has different dimensions. For example, the set of boxes or cuboids may have dimensions from 0.1 m-0.1 m-0.1 m to 3 m-3 m-3 m, where each additional box varies only in one dimension in increments of 0.1 m. In this example set, there are 27,000 unique boxes. For each box or cuboid, a set of features is selected.

The set of features is defined using a two dimensional projection of each box or cuboid as a template to identify objects in the normalised image. The projection is calculated for each pixel given the grazing angle φ and the local image resolution, the box or cuboid being centred on the pixel. The sonar image formation is approximated using ray tracing as shown in FIG. 4. This shows a model for the size of the highlight and shadow regions for a cube like object. The object has height z and width x and the highlight and shadow length are calculated for an image that has not been corrected for slant angle. The size of the highlight region in the across-track direction $h_x$ is related to the grazing angle φ as $h_x=x/\cos(\phi)$. The shadow length $s_x$ is $s_x=z/\sin(\phi)$.

Using the two dimensional projection, three classes of templates are defined corresponding to each box or cuboid. FIG. 5 shows the three template classes. These are (i) a standard object template that has a single highlight and shadow region—in this case the template response is the mean of the sum of the intensity of the pixels in both the highlight and shadow regions; (ii) a bounded front template, in which a 2D region the same size as the highlight region is defined before the highlight in the across-track direction—in this case the template response is the mean of the sum of the intensity of the pixels in this region subtracted from the mean of the sum of the pixels in the standard template response; and (iii) a bounded side template, in which a box or cuboid with half the width of the box or cuboid defining the standard template is defined each side of the standard template—in this case the template response is the mean of the sum of the intensity of the pixels in each side region, these template responses being subtracted from the standard template response to define the bounded side template response. For each template class, eleven templates are defined corresponding to discrete rotations of the box or cuboid. The rotations are chosen to match the skew rotations for the skewed integral images.

The standard object templates do not bound the region, and so the standard object template obtains a similar response on larger target-like regions such as ripples or clutter. The bounded front template and bounded side template can reject such regions as the first order feature response will tend towards zero. This enables false alarms due to the background to be minimised.

The orientation of the target is not known before image processing begins. For each 3D box or cuboid, the template response of the image to eleven different templates (where in the example above, each template includes three template classes each defined by a separate template, i.e. the standard template, the bounded front template and the bounded side template) is calculated. Each template corresponds to a discrete rotation of the object. Each template of each template class for each box or cuboid is centred on each pixel of the image and convolved (or otherwise) to determine the template response. The template response is a single numerical value produced by convolving the template with a particular location in the image or by extracting the value from the integer skewed integral images; these processes are mathematically equivalent. Once this is done, features are selected for that box or cuboid to represent information about the image.

In the example shown in FIG. 2, the template response is calculated by (i) calculating the sum of the intensity of the image pixels within the regions of the template (i.e. the highlight, shadow and bounding regions as appropriate) using the helper images to accelerate the calculation; (ii) calculating the sum of the intensity of the square of the image pixels within the template regions using the helper images to accelerate the calculation; (iii) calculating a first order response by calculating the difference of the mean of the sum of the image pixels within the template regions, i.e. the highlight and shadow regions for the standard template; (iv) calculating a second order response from the variance of the intensity of the pixels in the template regions using the sum of the image pixels within the template regions from the normalised image and the squared image; and (v) combining the first and/or second order responses to produce a single feature value for that template.

The feature value selected for inclusion in the feature vector may be the maximum of the eleven template responses for each template class (i.e. the feature which has the best overlap with the target). Additional statistical features may be calculated, such as the standard deviation of the pixels within the highlight and shadow regions of the standard template. Hence, each box is represented by four features, one corresponding to each template class and one calculated from the standard deviation of the pixels within the highlight and shadow regions. For each pixel in the image, a single feature vector is defined using these features. For the plurality of boxes mentioned above, there are 27,000 unique boxes each with four features per box thereby resulting in a feature vector that has 108,000 unique features per pixel. The feature vector is used to identify/recognise objects.

The feature set described above is large and it would be impractical to calculate all features for every pixel. Therefore, boosted decision trees are used for feature selection combined with a cascade structure. A cascade is a sequence of strong classifiers where each classifier in the sequence is trained and evaluated on the regions that are evaluated as target like by the previous classifier. A boosted decision tree classifier is formed from multiple weak classifiers. Weak classifiers are those for which the output is only weakly correlated to the true class (i.e. the classifier is slightly better than a random guess). Strong classifiers can be arbitrarily well correlated to the true class. A strong classifier can be created from a set of weak classifiers through boosting. The weighting of the training samples is altered such that samples classified correctly receive a lower weighting when evaluating the error for the next weak classifier. The strong classifier is created by summing the output of the weak classifiers multiplied by a weighting coefficient $\alpha_r$. This weights the classifiers according to their error over the training set. Using stump decision trees consisting of a single node, each weak classifier is essentially a cut over a single feature. Thus, the boosting algorithm selects the most informative features as a consequence of building the strong classifier. By tuning each strong classifier such that it retains greater than 98% of the positive samples and rejects 50% of the background samples a large proportion of the image can be discarded with relatively few calculations. This process is illustrated in FIG. 6.

Each pixel in the image is evaluated by the classifier. To do this, the feature vector for each pixel is entered into the classifier. The false alarm rate is minimised by grouping neighbouring positive pixels and applying a threshold on the number of pixels in the group. This process will be referred to as thresholding by the number of nearest neighbours.

The system is trained by providing it with examples of images which contain targets (Signal) and examples of images which do not contain targets (Background). Typically around one thousand or so target images (positive training set) are used in the training and around two thousand or so background images (negative training set). A single feature vector is calculated, as described above, for each training target example marked positive and for a random sample of the two thousand negative training sets respectively. The aim of the training process is to find the most informative features and to place bounds on those features which separate the positive and negative training samples.

The training consists of multiple stages; each stage eliminates more than 50% of the negative samples and retains more than 98% of the positive samples. As the same number of negative samples is required at each stage, of which 50% will have been eliminated by the previous stage the negative samples must be recalculated, from the remaining negative images, at each stage. A classifier is produced from the combination of all the stages. As the system is trained, it selects background samples, which it currently classifies incorrectly and uses these to improve the classification. The trained system is static and does not adapt/update itself during classification. The system can be retrained when new data is available by repeating the training stage with the additional data.

To test the method of the invention, images from two data sets have been tested. The data sets consist of 2,000 Edgetech and MarineSonics images randomly sampled from various tow-fish and Autonomous Underwater Vehicle (AUV) missions. These images include flat, rippled and cluttered regions of sea-floor. The images are randomly split into a training set and a testing set, and augmented reality objects are then inserted into the images [see P. Y. Mignotte, J. Vazquez, J. Wood, and S. Reed. "PATT: A Performance Analysis and Training Tool for the Assessment and Adaptive Planning of Mine Counter Measure (MCM) Operations", 2009, the contents of which are incorporated herein by reference]. The target set consists of a long narrow cylinder, a complex asymmetric object made up of several small spheres and a symmetric truncated cone (FIG. 7). The algorithm is trained on a data set consisting of positive target regions and background images which may contain other target types. The algorithm is trained and tested on the targets shown in FIG. 6. The performance characteristics for the three targets are shown for the Edgetech data set in FIG. 7.

From FIG. 7, it can be seen that the truncated cone and the complex classifier both achieve a probability of detection better than 95% for less than 20 false alarms per square kilometer. The cylinder classifier achieves a lower maximum probability of detection and an order of magnitude more false alarms. The probability of detection can be attributed to the low along-track resolution of the Edgetech sonar and the asymmetry of the cylinder target. Cylinders with their major axis oriented in the across-track direction have an along-track signature which is only 1 pixel wide (FIG. 6 top left). The low number of pixels increases the probability that random noise and clutter will have a target like signature. The large number of false alarms can be attributed to several rippled areas which are visually identical to the end on aspect of the cylinder. In cluttered and rippled regions which are not identical to the targets the false alarm rate is similar to that of the other two targets.

The results for the selectivity of the classifiers are shown in Table 2:

| | Object Type | | |
|---|---|---|---|
| Classifier | Truncated Cone | Cylinder | Complex |
| Truncatad Cone | 95% | 8% | 4% |
| Cylinder | 1% | 91% | 0% |
| Complex | 1% | 3% | 98% |

The classifier specified in the row heading is applied to the target type specified in the column heading. The cell contains the percentage of targets classified by the classifier. The probability of detection is taken for the classified output where there are 3 nearest neighbours. These results show that the 3D features algorithm performs well on all of the target types.

The cylindrical target is the most challenging target for the algorithm and produces a classifier with the largest number of features. Therefore, this target was used to test multi-sonar classification. Many filter response algorithms would be sensor specific. However, as simple features are used, which adapt according to the image formation model the algorithm can be applied generically between sonar types. Applying the algorithm without modification produces poor results due to the algorithm over-specialising on the statistical information specific to each sonar. Applying a median filter to the images removes much of this variation. FIG. 9 shows that the cylinder classifier trained on Edgetech data also performs well on the MarineSonics data.

While reducing statistical variation between images can produce a more generic classifier, this information is retained to obtain a high probability of detection. Therefore, where training data is available for all the desired sonar types the algorithm can be trained on a combined data set. FIG. 10 shows the performance characteristics for a cylinder classifier trained on both Edgetech and MarineSonics data. The performance is better than that for the classifier trained without the statistical data. However, a probability of detection of more than 80% is still achieved even on unseen sonar data.

The present invention provides a simple and effective template based technique for automatic target recognition in sonar images. In contrast to known template based approaches, in accordance with the invention, templates are not defined a priori. Instead, the most salient templates or features are selected during training using multiple different object shapes. Using these multiple different object shapes, targets can be more easily discriminated from background in cluttered regions.

Using locally adaptive features reduces the dependence of the classifier on specific operational conditions or make of sonar. Consequently, the algorithm can be trained on one type of sonar and applied to another with reasonable results. Training the algorithm on multiple sonar types, results in a single classifier with excellent performance for each sonar type.

The present invention provides a generic object detection technique for side scan sonar that has similar performance to state of the art detection and identification algorithms, whilst providing a performance that can be retained across different operational conditions using different sensor payloads. This allows target detection operations to be conducted with new vehicles and sensors without the initial cost and development time of building a target database and training an ATR algorithm. A sensor independent feature space allows vehicles with different sensor payloads to communicate information about their environment.

The invention may be embodied as a method, system, computer program product, or a combination of these. The invention may be implemented entirely in software or using software and hardware aspects. The invention may take the form of a computer program product on a computer-readable medium having computer-usable program code embodied in the medium.

A skilled person will appreciate that variations of the disclosed arrangements are possible without departing from the scope of the invention. Accordingly the above description of the specific embodiment is made by way of example only and not for the purposes of limitations. It will be clear to the skilled person that minor modifications may be made without significant changes to the operation described.

That which is claimed:

1. A method for recognising a target in a sonar image, the method comprising the steps of:
    normalising a sonar image;
    at least one of using or defining multiple three-dimensional test objects;
    rotating each three-dimensional test object between multiple positions;
    using a two-dimensional projection of each three-dimensional test object in each position as a template, so that multiple templates are provided for each test object, each template corresponding to a different rotational position;
    applying the multiple templates for the multiple test objects to the normalised image to determine a response for each template; and
    using the response determined for each template to create at least one feature vector representative of the image for use in target recognition,
    wherein:
        each template is at least one of the following three classes of templates: a standard object template, a bounded front template, or a bounded side template;
        the template response for each standard object template present is calculated as a mean of a sum of an intensity of the pixels in both highlight and shadow regions of the standard object template;
        the template response for each bounded front template present is calculated as a mean of a sum of an intensity of the pixels in a two-dimensional region the same size as the highlight region of the standard object template subtracted from a mean of a sum of the pixels in the standard template response; and
        the template response for each bounded side template present is calculated as a mean of a sum of an intensity of the pixels in each side region subtracted from the standard template response.

2. A method as claimed in claim 1 wherein each template comprises at least a highlight region and a shadow region.

3. A method as claimed in claim 2, wherein a plurality of classes of templates are defined for each template.

4. A method as claimed in claim 3, wherein the plurality of classes of templates comprise the standard template having only the highlight and the shadow region.

5. A method as claimed in claim 3, wherein the plurality of classes of templates comprise a bounded front template, in which the two-dimensional region the same size as the highlight region is added before the highlight region in an across-track direction.

6. A method as claimed in claim 3, wherein the plurality of classes of templates comprise a bounded side template, in which each side of the combined highlight and shadow region is bounded.

7. A method as claimed in claim 1, wherein applying the multiple templates for the multiple test objects to the normalised image to detect an object in the normalised image involves convolving the multiple templates with the normalised image.

8. A method as claimed in claim 1, further comprising the steps of:
    using the normalised image to define a plurality of skewed integral images, each for a different skew angle; and
    applying the multiple templates for the multiple test objects to the skewed integral images.

9. A method as claimed in claim 8, wherein the skewed integral images are skewed at angles that correspond to the different rotational positions of the templates.

10. A method as claimed in claim 1, wherein the step of normalising features in the sonar image involves normalising the whole image and then applying the multiple templates or normalising one pixel of the image based on local image statistics and then applying the multiple templates for that pixel.

11. A method as claimed in claim 1, further comprising the step of determining at least one feature value for each template, the feature value for each template being included in the feature vector.

12. A method as claimed in claim 11, wherein when a plurality of classes of templates are provided and the method further involves determining a feature value for each template class and adding the feature value for each template class to the feature vector.

13. A method as claimed in claim 12, further comprising the step of using the feature vector for target recognition.

14. A method as claimed in claim 12, further comprising the step of using the feature vector in a target recognition classifier.

15. A method as claimed in claim 14 wherein the target recognition classifier comprises a supervised machine learning algorithm.

16. A method as claimed in claim 1, further comprising the step of capturing the sonar image.

17. The method as claimed in claim 1 wherein the response for each template is determined by calculating a mean and a variance of pixels inside skewed rectangular regions in each template.

18. A computer implemented target detection system, said system comprising one or more memory storage areas and one or more computer processors configured to perform the method of claim 1.

19. A computer program product comprising at least one non-transitory computer-readable medium having computer-usable program code embodied therein, the computer-usable program code being configured for performing the method of claim 1.

* * * * *